Dec. 24, 1957 H. MOTZET ET AL 2,817,248
DOUBLE CAM
Filed March 31, 1954

INVENTORS
OSWALD BÖLLER &
HANS MOTZET
BY Marechal, Biebel, French & Bugg
ATTORNEYS

United States Patent Office 2,817,248
Patented Dec. 24, 1957

2,817,248

DOUBLE CAM

Hans Motzet and Oswald Böller, Augsburg, Germany, assignors to Maschinenfabrik Augsburg-Nurnberg A. G., Augsburg, Germany, a corporation of Germany Application March 31, 1954, Serial No. 420,137

Claims priority, application Germany May 19, 1953

5 Claims. (Cl. 74—567)

This invention relates to a double cam mechanism adapted for use in actuating, for example, the valves of reversible internal combustion engines.

In internal combustion engines adapted to be selectively operated in either direction of rotation, the inlet and outlet valves, fuel pumps, etc., may be controlled by cam actuated linkages with different sequence and/or timing of actuation during operation of the engine in one direction from that desired during operation in the reverse direction of rotation. Separate forward and backward cam control surfaces may be provided along with means for axially shifting the cam shaft with respect to the cam follower during a reversing operation so that the cam follower selectively engages either the forward or the backward cam controlled surfaces. A beveled rising or leading lateral surface may be provided on the cam control surfaces for the purpose of leading the cam follower smoothly from one cam control surface to the other upon axially shifting the cams.

If the slope or inclination of such surfaces, however, is made relatively steep, in order to limit the aggregate thickness of the cam mechanism, a relatively great force is necessary to shift the cams which, under certain circumstances, may give rise to undesirably high stresses on the cam shaft and the axially shiftable slides or guides therefor. On the other hand, the space available for axially shifting the cam control surfaces may be so limited, e. g., by the distance between adjacent cylinders of the engine, that a sufficiently gentle inclination of the slope of the beveled rising surfaces leading from one cam to the other may not be achieved without sacrificing to an objectionable degree the width of the peripheral cam running surfaces on which the cam follower rides.

According to the present invention, however, two such cam control surfaces are provided for selective engagement with a single cam follower so that beveled rising or leading surfaces have an adequately gentle slope to lead the cam follower smoothly from one cam surface to the other upon axial shifting of the cam shaft. This is achieved according to the present invention by providing two adjacent coaxially mounted cams with beveled surfaces leading from one to the other and partially overlapping so that the beveled surfaces will have a sufficiently gentle slope for smooth operation upon axial shifting of the cams while neither sacrificing adequate breadth of the cam controlled running surface nor providing an aggregate cam width or thickness beyond such space limitations as the distance between adjacent engine cylinders.

It is an object of the present invention to obtain, simultaneously with broad cams and rocking levers or buffer bar rollers and sufficiently large cam lift, a small shift of the control shaft upon reversal, in order not to exceed the limited movement afforded by the distance between the cylinders.

A further object of the present invention is to provide a double cam for reversible internal combustion engines which employs a relatively shallow rising surface for shifting the cam and also requires a minimum axial movement to complete the shifting.

Another object of this invention is to provide a double cam for reversible internal combustion engines which may be formed by a few relatively simple machining operations.

Other objects and advantages of the invention will be apparent from the following description, the accompanying drawing and the appended claims.

Figure 1:
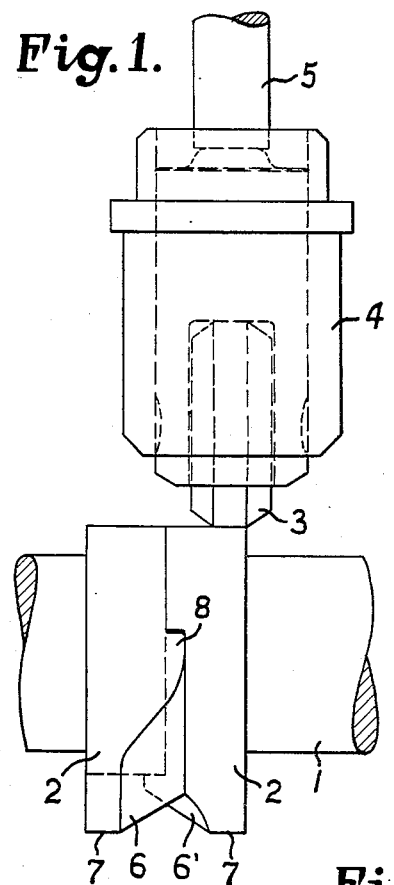
Fig. 1 shows a front elevation of a double cam with control shaft and following roller.

Referring to the drawing, which illustrates a preferred embodiment of the invention, there is shown a cam shaft 1 which is slidably adjustable along its longitudinal axis relative to a cam following roller 3. The cam is comprised of two identical ring members 2, 2' mounted upon the cam shaft 1. Shaft 1 is axially shiftable upon reversal of the engine (in the conventional manner by apparatus not shown) in such manner that, when the engine is running in one direction, ring 2 is aligned with roller 3, and, when the rotation of the engine is reversed, ring 2' is aligned with the roller 3. Rotation of cam shaft 1 causes roller 3 to follow whichever cam it is aligned with by reciprocating in guide 4, thus imparting a reciprocating motion to push rod 5 which controls a valve or other appurtenance (not shown) of the engine in well-known manner.

Figure 3:
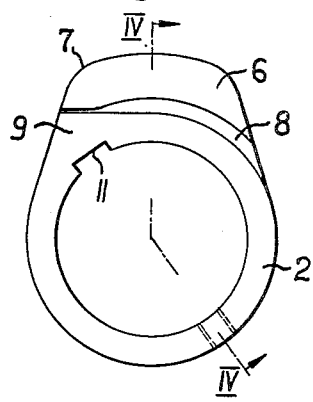
Fig. 3 shows a side view of one half of the double cam.
Figure 4:
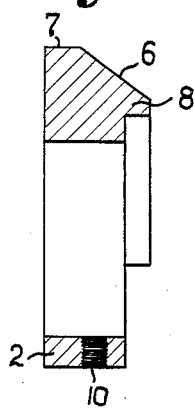
Fig. 4 shows a section on line IV—IV of Fig. 3.

Each ring member 2, 2' has a lobe 7, 7' formed thereon, the outer surface of which is faired into the outer surface of the ring member to provide a continuous cam surface for actuating the following roller 3 as above described. Arcuate projections or rims are provided at 8, 8' to extend from the lobes 7, 7' along the connection between the lobes and the ring members 2, 2' as best seen in Fig. 3. Rising surfaces 6, 6', for facilitating the sliding of the roller 3 up onto the cam surface when the cam shaft 1 is shifted, are provided by beveling the sides of each lobe 7, 7', from which the projection 8 extends, into the top of that projection, as seen in Fig. 4.

Figure 2:
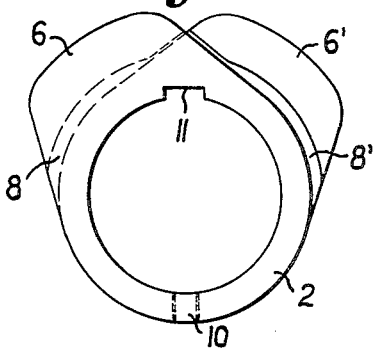
Fig. 2 shows a side view of the double cam.

To assemble the cam of the present invention, the ring members 2, 2' are mounted on cam shaft 1 so that the projection 8, 8' and rising surfaces 6, 6' are facing each other. The ring members are pushed together until lobes 7, 7' are adjacent each other but extending at opposite angles relative to the axis of cam shaft 1, and the projections 8, 8' are engaged over a portion of the outer surface of the opposite ring members 2, 2', as seen in Fig. 2. In order to position the lobes 7, 7' at the correct angle on the cam shaft, it may be necessary in certain instances to remove a portion of the projections 8, 8' at one corner of lobes 7, 7'. This portion is indicated at 9 in Fig. 3, and may be removed by any convenient means, such as grinding or milling.

A key slot 11 is formed in each ring member 2, 2' so that they may be keyed or wedged to cam shaft 1 and thus secured against twisting out of position around the shaft. Also, each ring member is bored and tapped at 10 to receive a set screw which will secure the ring members 2, 2' against axial shifting along shaft 1.

With the parts assembled as shown in Fig. 1, axial movement of cam shaft 1 will position one or the other of ring members 2, 2' in line with following roller 3. The roller can easily slide along the relatively shallow slopes of risers 6, 6' with a minimum of resistance to such axial movement, and ascend to the appropriate cam surface. At the same time, due to the overlapping arrangement of projections 8, 8', the amount of axial movement of the cam shaft 1 to effect such shifting is held to a minimum and the cam surfaces upon which follower 3 must run are sufficiently wide to eliminate any undesirable running stresses.

A cam constructed according to the present invention eliminates the difficult machine operations formerly necessary to generate the separate cam and rising surfaces. The two ring members 2, 2' can be easily machined to provide their respective lobes 7, 7' and the beveled rising surfaces 6, 6'. Since the two ring members are identical, the same setup may be used to produce the entire double cam.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control cam for reversible internal combustion engines, said cam comprising a pair of ring members centrally apertured to fit around a cam shaft, each of said ring members having a lobe formed thereon, and means providing an arcuate projection extending from each lobe along a portion of the connection between said lobe and its respective ring member, said ring members being adapted for assembly in operating position on said cam shaft with their respective lobes adjacent each other and with each said arcuate projection overlapping the opposite ring member.

2. A valve control cam for reversible internal combustion engines having a cam follower and cam shaft, comprising a pair of ring members having central apertures of a size to fit around said cam shaft, each said ring member having a lobe formed thereon to present to said follower a continuous cam surface which includes the outer surface of said ring and the outer surface of said lobe, and means forming arcuate projections extending from one side of said lobe along a substantial portion of the connection between said lobe and said ring member, said projection including means forming a rising surface extending from the edge of said projection to the outer surface of said lobe, and means for assembling said ring members on said cam shaft with their respective lobes adjacent each other and each said arcuate projection overlying a portion of the outer surface of the opposite said ring member.

3. In a reversible internal combustion engine having an axially shiftable cam shaft for selectively presenting separate cam surfaces to a cam when reversing the rotation of said engine, the combination of cam members for actuating said follower, each said cam member including a pair of identical ring members having central apertures fitting around said cam shaft, each said ring member having a lobe formed thereon to present to said follower a continuous cam surface which includes the outer surface of said ring member and the outer surface of said lobe, and means forming arcuate projections extending from each of said lobes along the connection between said lobe and said ring member, means forming a rising surface extending from the edge of said projection to the outer surface of the respective said lobe to provide for positioning said follower on said cam surface in operative position, and means for assembling said ring members on said cam shaft with said lobes adjacent and each said arcuate projection overlying a portion of the outer surface of the opposite said ring member.

4. The combination of claim 3 wherein said arcuate projections are cut away at one corner of said lobes to facilitate positioning of said lobes closely adjacent each other in assembled position on said cam shaft.

5. In a double cam arranged for axial movement relative to its follower to present selectively separate cam surfaces to said follower, the combination of a pair of identical ring members, each said ring member having a lobe formed thereon to provide a cam surface which includes the outer surface of said ring member and the outer surface of said lobe, means forming arcuate projections extending from one side of each said lobes along the juncture of said lobes with said ring members, and means providing a rising surface extending from the edge of said projections to the outer surface of said lobes, said ring members being assembled with said rising surfaces facing each other and said arcuate projections overlapping a portion of the outer surface of the opposed said ring member.

References Cited in the file of this patent

UNITED STATES PATENTS

| 502,219 | Amsbury | July 25, 1893 |
| 692,483 | Rueger | Feb. 4, 1902 |
| 1,558,514 | Sperry | Oct. 27, 1925 |

FOREIGN PATENTS

| 51,613 | Netherlands | Dec. 15, 1941 |
| 157,418 | Switzerland | Dec. 1, 1932 |
| 468,843 | Germany | Nov. 23, 1928 |